June 18, 1963 R. W. SNIDER 3,093,910
MIRROR ADJUSTING DEVICE
Filed May 2, 1960

Robert W. Snider
INVENTOR.

BY *Clarence A. O'Brien
and Harvey B. Jacobson*
Attorneys

United States Patent Office 3,093,910
Patented June 18, 1963

3,093,910
MIRROR ADJUSTING DEVICE
Robert W. Snider, R.R. 2, Bethel, Ohio
Filed May 2, 1960, Ser. No. 26,203
7 Claims. (Cl. 33—180)

This invention relates to means for simply and accurately recording the adjusted position of an adjustable mirror, such as the side view mirror mounted on automobile fenders for rear sightings by the driver of the vehicle.

It is therefore a primary object of this invention, to provide a simple and inexpensive apparatus that may be easily applied to an adjustable mirror such as a side view mirror on an automotive vehicle after it has been accurately adjusted, said apparatus then recording the adjusted position of the adjustable mirror so that when the adjustable mirror is displaced from its adjusted position, the recording apparatus may be reapplied to the mirror, enabling one to quickly and accurately position said mirror into its original and accurate adjusted position.

A further object of this invention in accordance with the foregoing objects, is to provide a recording apparatus to be used for readjustment of an adjustable mirror into accurate adjusted position, which apparatus is of simple construction requiring little modification of the adjustable mirror to which it is applied and which apparatus may be of different sizes and shapes to be applicable to mirrors of varying sizes and shapes.

In accordance with the foregoing objects, there is provided a backing plate holder for a numbered sheet of graph paper, said backing plate holder being mounted in spaced position relative to a mirror frame base or support by a hinge connection and a block receivably fitted over the mirror within its frame for mounting a pair of styli biased yieldably outward into engagement with the graph paper on the backing plate so that both the position of the mirror frame relative to the base support and the position of the mounting block within the mirror frame may be recorded by the styli on the graph paper after the mirror has been accuately adjusted. Accordingly, when the mirror has for some reason been displaced from its adjusted position, the apparatus may be reapplied to the supporting base and mirror frame and the mirror fame adjusted until the styli are aligned with the markings on the graph paper that were made when the mirror was in its adjusted position to thereby readjust the mirror in an accurate and speedy fashion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
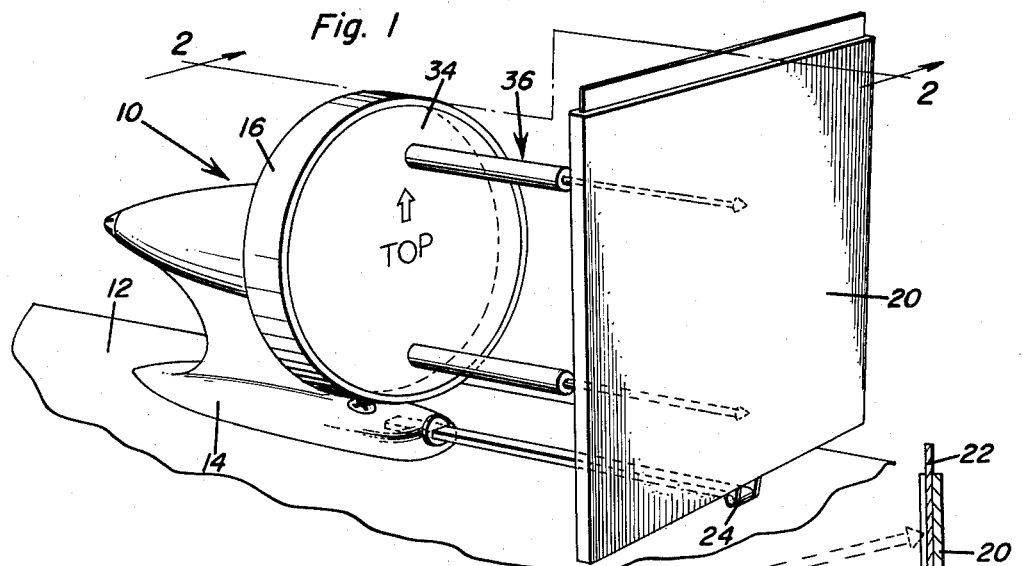
FIGURE 1 illustrates the positioning apparatus applied to an adjustable mirror assembly in accordance with this invention.
Figure 2:
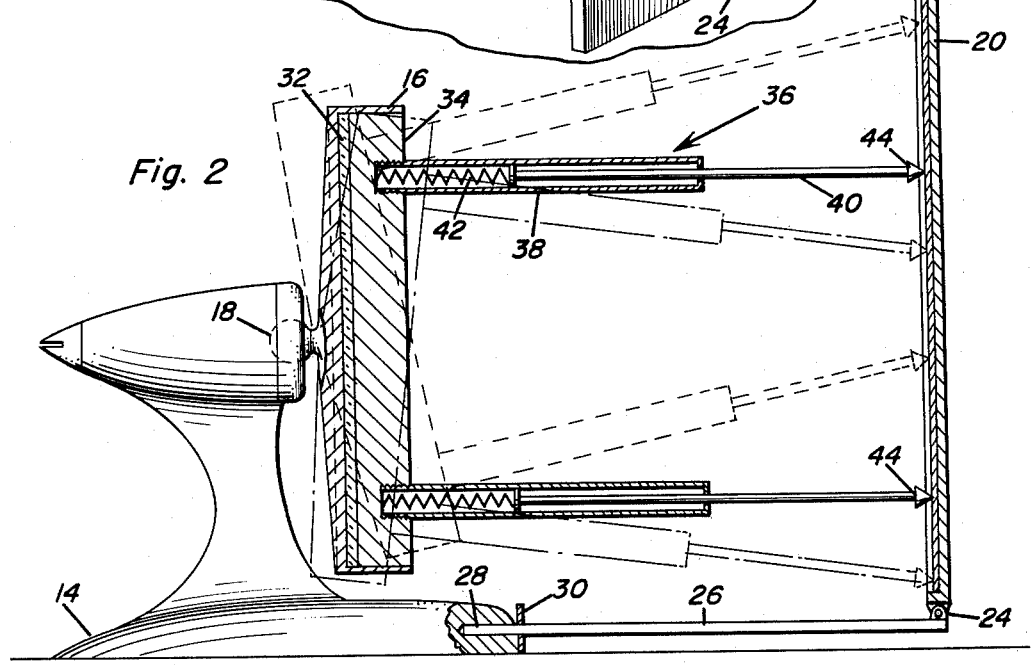
FIGURE 2 is a sectional view taken through a plane indicated by section line 2—2 in FIGURE 1.

Referring to the drawing in detail, FIGURE 1 shows the positioning apparatus applied to an adjustable mirror assembly 10 which is mounted on a vehicle fender 12 by means of a stand or base support 14 to which a mirror frame 16 is connected by a universal joint 18 as more clearly seen in FIGURE 2.

The positioning apparatus includes a backing plate mounting or holder 20 into which the sheet of lettered graph paper 22 is inserted. The backing plate mounting 20 is hingedly connected by means of hinge 24 to a slide member 26 of rectangular cross-section which is insertable into an opening 28 which is provided therefor in the base of the mirror support 14. A stop member 30 is secured to the slide member 26 so as to accurately position the hinge 24 in spaced relation to the mirror support base 14.

Fitted within the mirror frame 16 in front of the mirror 32, is a mounting block 34 forming part of the positioning apparatus. The mounting block is inserted into the mirror frame 16 in approximately vertically aligned position by means of the arrow labeled TOP printed on the surface of the mounting block 34. The mounting block has secured thereto a pair of vertically aligned identical assemblies or markers indicated by reference numeral 36. Each assembly 36 includes a tubular member 38 threadedly or otherwise secured to the mounting block and a slide rod 40 biased outwardly by means of spring 42, the outer end of the rod 40 having a stylus 44 thereon. It will be understood of course, that the lower assembly 36 is of identical construction and arrangement as the upper assembly 36.

Figure 3:
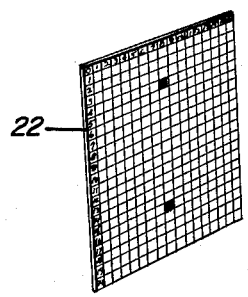
FIGURE 3 is a perspective view of a marked sheet of graph paper used together with the apparatus in accordance with this invention.

Referring to FIGURES 2 and 3, it will be obvious that the graph paper on which the recordings are made is inserted into the backing plate mounting 20 and may be numbered along two edges as indicated in FIGURE 3 so to identify the squares marked by the styli 44.

From the foregoing description, operation of the apparatus will be apparent. Accordingly, after the adjustable mirror frame 16 has been accurately positioned for the first time by the vehicle driver, the apparatus in accordance with this invention is applied as described. The mounting block 34 will then be inserted into the mirror frame 16 above the mirror 32 in a careful manner so as not to displace the mirror frame 16 from its adjusted position. Also, the graph paper will be inserted into the backing plate mounting 20 and the mounting positioned in spaced relation to the mirror frame supporting base 14 by means of slide 26. When the backing plate mounting 20 is raised to vertical position it will be marked by the styli 44 at two points, each of said points thereby representing the position of the mirror frame 16 both vertically and horizontally while the vertical misalignment of the two points on the graph will represent rotational misalignment of the mounting block 34 relative to the frame 16. After the adjusted position of the mirror has been so recorded, the positioning apparatus may be easily removed and the marked graph paper 22 may be retained for future readjustment purposes or destroyed after the marked space numbers have been recorded.

When the adjustable mirror has been displaced from its accurately adjusted position, it may be readily readjusted by reapplying the positioning apparatus as heretofore described. The mirror frame 16 is then moved or adjusted until the styli 44 are in alignment with the marked spaces on the graph paper 22 inserted into the backing plate mounting 20 for readjustment purposes. It is therefore obvious that the mirror frame 16 will be readjusted accurately without requiring tedious trial and error movements of the mirror frame 16 by the driver.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mirror positioning apparatus for a mirror frame adjustably mounted on a mirror frame support comprising, recording means, removable mounting means carrying said recording means for positioning it relative to the mirror frame support, marking means insertable into the mirror frame and comprising a plurality of spaced, parallel markers yieldably engageable with said recording means at spaced points and operative thereby to define a plane predetermined by an adjusted position of the mirror frame on its support, said recording means thereby recording the position of said marking means when the mirror frame is in adjusted position.

2. The apparatus as defined in claim 1, wherein said recording means comprises a sheet of graph paper.

3. The apparatus as defined in claim 2, wherein said mounting means comprises a backing plate for said graph paper, hingedly connected to a slide member insertable into the mirror frame support in spaced relation thereto.

4. The apparatus as defined in claim 3, wherein said marking means includes a circular mounting block receivably fitted to the mirror frame and carrying the markers, each of said markers including a tubular member connected off-center to said block and projecting toward said backing plate and a paper marking rod slidably mounted within said tubular member and biased outwardly therefrom into engagement with said backing plate and graph paper so as to mark the graph paper and record the adjusted position of the mirror frame.

5. The apparatus as defined in claim 1, wherein said markers include styli yieldably biased into engagement with said recording means for recording the adjusted position of the mirror frame and the position of the marking means relative to the mirror frame.

6. A device for positioning an adjustable mirror comprising, a stationary graph sheet, means for supporting said graph sheet in a predetermined position in spaced, opposed relation to the mirror, and a pair of spaced, parallel markers mounted on the mirror for movement in unison therewith and operatively engageable with said graph sheet for recording the adjusted position of the mirror and the position of the markers relative to said mirror.

7. A device for positioning an adjustable mirror of the type including a stand, said device comprising a holder mounted on the stand, a graph sheet mounted on said holder in spaced, opposed relation to the mirror, and a pair of spaced, parallel markers mounted on the mirror for movement in unison therewith and operatively engageable by the graph sheet for recording the adjusted position of the mirror and the position of the markers relative to said mirror.

References Cited in the file of this patent

UNITED STATES PATENTS

| | | |
|---|---|---|
| 1,309,429 | Stephens | July 8, 1919 |
| 2,438,358 | Castiglia | Mar. 23, 1948 |
| 2,819,533 | Markle | Jan. 14, 1958 |